United States Patent
Chen et al.

(10) Patent No.: US 6,498,449 B1
(45) Date of Patent: Dec. 24, 2002

(54) LOW RIPPLE TORQUE CONTROL OF A PERMANENT MAGNET MOTOR WITHOUT USING CURRENT SENSORS

(75) Inventors: Shaotang Chen, Troy, MI (US); Chandra Sekhar Namuduri, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 5 days.

(21) Appl. No.: 09/663,900

(22) Filed: Sep. 18, 2000

Related U.S. Application Data

(60) Provisional application No. 60/154,613, filed on Sep. 17, 1999, provisional application No. 60/154,681, filed on Sep. 17, 1999, and provisional application No. 60/183,301, filed on Feb. 17, 2000.

(51) Int. Cl.$^7$ .................. H02K 17/32; H02K 23/68; H02K 27/30; H02P 7/00
(52) U.S. Cl. .................. 318/434; 318/805; 318/799; 318/806
(58) Field of Search .................. 318/434, 798–801, 318/805, 806, 808–812, 599

(56) References Cited

U.S. PATENT DOCUMENTS

| | | | |
|---|---|---|---|
| 3,898,544 A | 8/1975 | Tanikoshi | 318/254 |
| 3,919,609 A | 11/1975 | Klautschek et al. | 318/227 |
| 4,027,213 A | 5/1977 | de Valroger | 318/138 |
| 4,135,120 A | 1/1979 | Hoshimi et al. | 318/227 |
| 4,217,508 A | 8/1980 | Uzuka | 310/46 |
| 4,240,020 A | 12/1980 | Okuyama et al. | 318/721 |
| 4,392,094 A | 7/1983 | Kuhnlein | 318/254 |
| 4,447,771 A | 5/1984 | Whited | 18/661 |
| 4,511,827 A | 4/1985 | Morinaga et al. | 318/254 |
| 4,556,811 A | 12/1985 | Hendricks | 310/266 |
| 4,558,265 A | 12/1985 | Hayashida et al. | |
| 4,633,157 A | 12/1986 | Streater | 318/723 |
| 4,686,437 A * | 8/1987 | Langley et al. | 318/138 |
| 4,688,655 A | 8/1987 | Shimizu | 180/79.1 |
| 4,745,984 A | 5/1988 | Shimizu | 180/79.1 |
| 4,814,677 A | 3/1989 | Plunkett | 318/254 |
| 4,835,448 A | 5/1989 | Dishner et al. | 318/254 |
| 4,837,692 A | 6/1989 | Shimizu | 364/424.05 |
| 4,868,477 A | 9/1989 | Anderson et al. | 318/696 |
| 4,868,970 A | 9/1989 | Schultz et al. | 29/596 |

(List continued on next page.)

Primary Examiner—Robert E. Nappi
Assistant Examiner—Edgardo San Martin
(74) Attorney, Agent, or Firm—Edmund P. Anderson

(57) ABSTRACT

A method and apparatus for controlling the torque of and reducing torque ripple in a permanent magnet motor without using current sensors. By eliminating the need for current sensors, low frequency torque ripple is reduced. A voltage mode control method is implemented to control the motor. In response to the position and speed of the rotor and a torque command signal, a controller develops motor voltage command signals indicative of the voltage required to produce the desired motor torque. A rotor position encoder determines the angular positions of the rotor. From the angular positions of the rotor, a speed measuring circuit determines the speed of the rotor. The position and speed signals are applied to the controller. The controller uses this information and develops the motor voltage command signals indicative of the voltage needed to produce the desired motor torque. An inverter is coupled between a power source and the controller. The circuit applies phase voltages to the motor, in response to the motor voltage command signals, to produce the desired motor torque.

18 Claims, 3 Drawing Sheets

U.S. PATENT DOCUMENTS

| | | | | |
|---|---|---|---|---|
| 4,882,524 A | | 11/1989 | Lee | 318/254 |
| 4,912,379 A | | 3/1990 | Matsuda et al. | 318/254 |
| 4,988,273 A | * | 1/1991 | Faig et al. | 318/138 |
| 4,992,717 A | | 2/1991 | Marwin et al. | 318/696 |
| 5,006,774 A | | 4/1991 | Rees | 318/721 |
| 5,040,629 A | | 8/1991 | Matsuoka et al. | 180/79.1 |
| 5,063,011 A | | 11/1991 | Rutz et al. | 264/126 |
| 5,069,972 A | | 12/1991 | Versic | 428/407 |
| 5,076,381 A | | 12/1991 | Daido et al. | 180/79.1 |
| 5,122,719 A | | 6/1992 | Bessenyei et al. | 318/629 |
| 5,223,775 A | | 6/1993 | Mongeau | 318/432 |
| 5,239,490 A | | 8/1993 | Masaki et al. | 364/565 |
| 5,331,245 A | | 7/1994 | Burgbacher et al. | 310/186 |
| 5,345,156 A | * | 9/1994 | Moreira | 318/254 |
| 5,349,278 A | | 9/1994 | Wedeen | 318/632 |
| 5,361,210 A | | 11/1994 | Fu | 364/424.05 |
| 5,428,285 A | | 6/1995 | Koyama et al. | 318/799 |
| 5,433,541 A | | 7/1995 | Hieda et al. | 400/279 |
| 5,444,341 A | | 8/1995 | Kneifel, II et al. | 318/432 |
| 5,460,235 A | | 10/1995 | Shimizu | 180/79.1 |
| 5,461,293 A | * | 10/1995 | Rozman et al. | 318/603 |
| 5,467,275 A | | 11/1995 | Takamoto et al. | 364/426.01 |
| 5,469,215 A | | 11/1995 | Nashiki | 318/432 |
| 5,475,289 A | | 12/1995 | McLaughlin et al. | 318/432 |
| 5,493,200 A | * | 2/1996 | Rozman et al. | 322/10 |
| 5,517,415 A | * | 5/1996 | Miller et al. | 701/43 |
| 5,554,913 A | | 9/1996 | Ohasawa | 318/434 |
| 5,568,389 A | | 10/1996 | McLaughlin et al. | 364/424.05 |
| 5,569,994 A | | 10/1996 | Taylor et al. | 318/700 |
| 5,579,188 A | | 11/1996 | Dunfield et al. | 360/99.08 |
| 5,585,708 A | | 12/1996 | Richardson et al. | 318/800 |
| 5,616,999 A | | 4/1997 | Matsumura et al. | 318/632 |
| 5,623,409 A | | 4/1997 | Miller | 364/424.05 |
| 5,642,044 A | | 6/1997 | Weber | 324/207.25 |
| 5,656,911 A | | 8/1997 | Nakayana et al. | 318/718 |
| 5,668,721 A | | 9/1997 | Chandy | 701/41 |
| 5,672,944 A | | 9/1997 | Gokhale et al. | 318/254 |
| 5,701,065 A | | 12/1997 | Ishizaki | 318/701 |
| 5,739,650 A | * | 4/1998 | Kimura et al. | 318/254 |
| 5,777,449 A | | 7/1998 | Schlager | 318/459 |
| 5,780,986 A | | 7/1998 | Shelton et al. | 318/432 |
| 5,803,197 A | | 9/1998 | Hara et al. | 180/248 |
| 5,811,905 A | | 9/1998 | Tang | |
| 5,852,355 A | | 12/1998 | Turner | 318/701 |
| 5,881,836 A | | 3/1999 | Nishimoto et al. | 180/446 |
| 5,898,990 A | | 5/1999 | Henry | 29/598 |
| 5,919,241 A | | 7/1999 | Bolourchi et al. | 701/41 |
| 5,920,161 A | | 7/1999 | Obara et al. | 318/139 |
| 5,929,590 A | | 7/1999 | Tang | |
| 5,962,999 A | | 10/1999 | Nakamura et al. | |
| 5,963,706 A | | 10/1999 | Baik | 388/804 |
| 5,977,740 A | | 11/1999 | McCann | 318/701 |
| 5,984,042 A | | 11/1999 | Nishimoto et al. | 180/446 |
| 5,992,556 A | | 11/1999 | Miller | 180/446 |
| 6,002,226 A | | 12/1999 | Collier-Hallman et al. | 318/439 |
| 6,002,234 A | | 12/1999 | Ohm et al. | 318/729 |
| 6,009,003 A | | 12/1999 | Yeo | 363/37 |
| 6,034,460 A | | 3/2000 | Tajima | 310/179 |
| 6,034,493 A | | 3/2000 | Boyd et al. | 318/254 |
| 6,043,624 A | | 3/2000 | Masaki et al. | |
| 6,049,182 A | | 4/2000 | Nakatani et al. | |
| 6,129,172 A | | 10/2000 | Yoshida et al. | 180/446 |

* cited by examiner

LOW RIPPLE TORQUE CONTROL OF A PERMANENT MAGNET MOTOR WITHOUT USING CURRENT SENSORS

CROSS-REFERENCE TO RELATED APPLICATIONS

This application is based upon, and claims the benefit of, U.S. Provisional Patent Application No. 60/154,613, filed Sep. 17, 1999; No. 60/154,681, filed Sep. 17, 1999; and No. 60/183,301, filed Feb. 17, 2000, the disclosures of all three of which are incorporated by reference herein in their entirety.

TECHNICAL FIELD

This invention relates to torque control of a sinusoidally excited permanent magnet motor, and more particularly to reducing the low frequency torque ripple, or smoothing the torque, in such a motor.

BACKGROUND OF THE INVENTION

It is known in the art relating to electric motors that polyphase permanent magnet (PM) brushless motors with a sinusoidal field offer the capability of providing low torque ripple, noise, and vibration in comparison with those with a trapezoidal field. Theoretically, if a motor controller can produce polyphase sinusoidal currents with the same frequency as that of the sinusoidal back-emfs (also known as "back-voltages"), the torque output of the motor will be a constant, and zero torque ripple can be achieved. However, due to practical limitations of motor design and controller implementation, there are always deviations from those assumptions of pure sinusoidal back-emf and current waveforms. The deviations will usually result in parasitic torque ripple components at various frequencies and magnitudes. The methods of torque control can influence the level of this parasitic torque ripple.

One method for torque control of a permanent magnet motor with a sinusoidal back-emf is accomplished by controlling the motor phase currents so that its current vector is aligned with the back-emf. This control method is known as the current mode control method. In such a method, the motor torque is proportional to the magnitude of the current. The current mode control method requires a complex controller for digital implementation. The controller requires two or more A/D channels to digitize the current feedback from current sensors. In a three-phase system, it is convenient to transform the three-phase variables into a two dimensional d-q synchronous frame which is attached to the rotor and design the controller in the d-q frame. But, due to considerable calculations and signal processing involved in performing the d-q transformation, reverse d-q transformation and P-I loop algorithms, a high speed processor such as a digital signal processor (DSP) has to be used to update the controller information every data sampling cycle.

SUMMARY OF THE INVENTION

A method and system for controlling the torque of a sinusoidally excited PM motor to reduce low frequency torque ripple, or smooth torque, is disclosed. The low frequency torque ripple is reduced by a controller which calculates the voltage required for producing the desired torque based on motor equations. The controller is implemented using only feedback of the rotor position and speed.

The method and system of the invention preserve the smoothness of sinusoidal commutation while eliminating the sensitivity of torque ripple due to current sensors of the prior art. The controller of the invention features a low cost implementation that not only eliminates the hardware of current sensors and A/D converters of the prior art, but also considerably reduces the software computation needs, e.g., no d-q transformations and P-I loops are necessary. A low cost microprocessor may be used with the invention instead of the DSPs of the prior art.

The method of the invention senses angular positions of a rotor and determines its rotational speed. In response to the position and speed of the rotor and a torque command signal, a controller develops varying motor voltage command signals indicative of the voltage needed to produce a desired motor torque. Phase voltages are applied across the motor windings in response to the motor voltage command signals to develop the desired motor torque.

The system disclosed herein includes a rotor position encoder coupled to the motor for sensing the angular positions of the rotor and outputting a position signal. A speed measuring circuit is connected to the position encoder for determining the speed of the rotor and outputting a speed signal. The position and speed signals are applied to a controller. The controller develops varying motor voltage command signals in response to the position signal, speed signal, and a torque command signal indicative of a desired motor torque. A power circuit is coupled between a power source and the controller for applying phase voltages across the motor in response to the motor voltage command signals to develop the desired motor torque.

One application for the voltage mode control method and system disclosed herein is in a power steering controller for an electric power steering system. The motor is coupled directly into the steering column to provide steering assist torque. Therefore, even a small level of low frequency torque ripple produced by the motor can be felt at the steering wheel. By using the voltage mode control method disclosed herein, the low frequency torque ripple is reduced and a smooth steering feel is achieved.

DESCRIPTION OF THE PREFERRED EMBODIMENT

Figure 1:
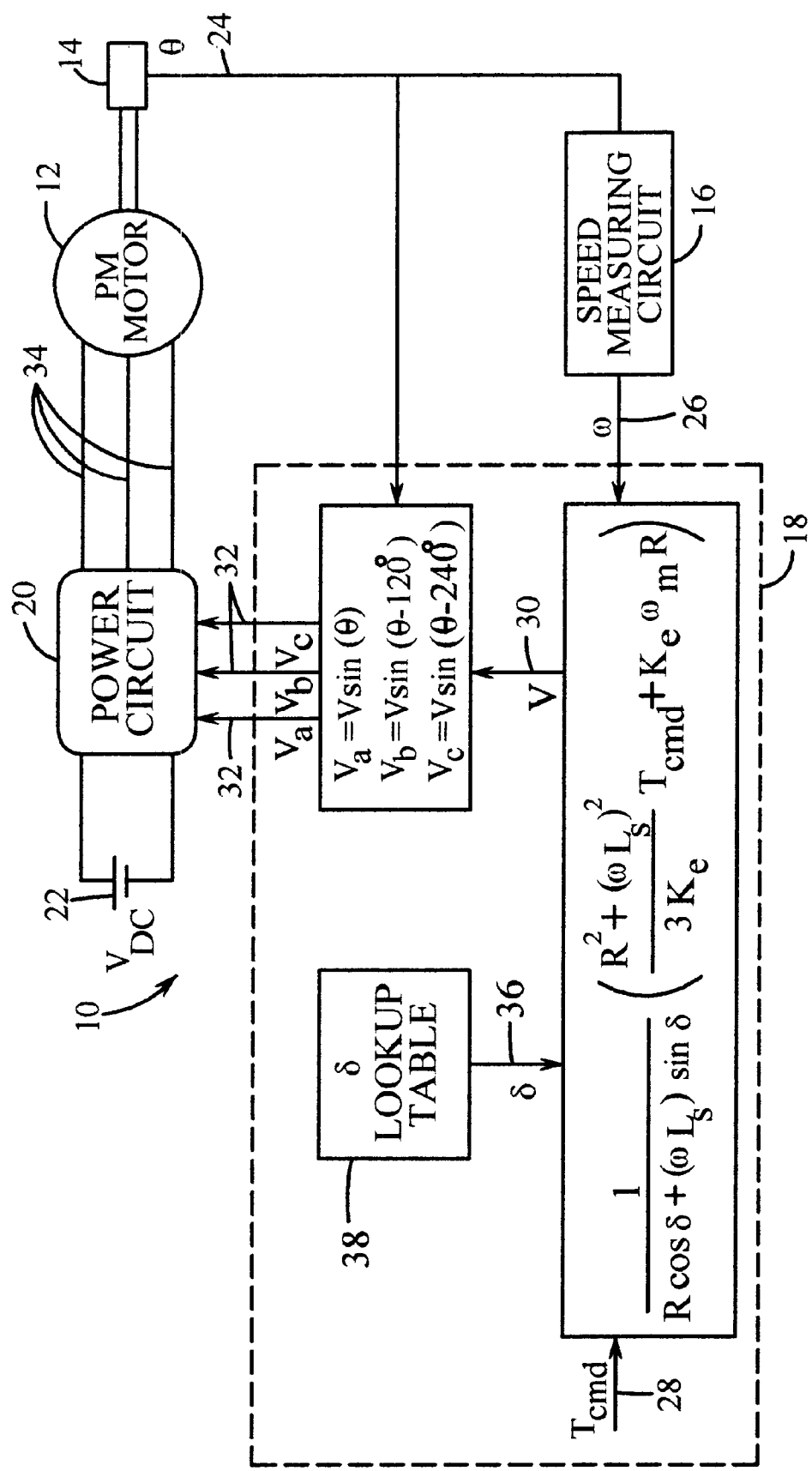
FIG. 1 is a block diagram of a system for controlling the torque of a sinusoidally excited permanent magnet motor.
Figure 2:
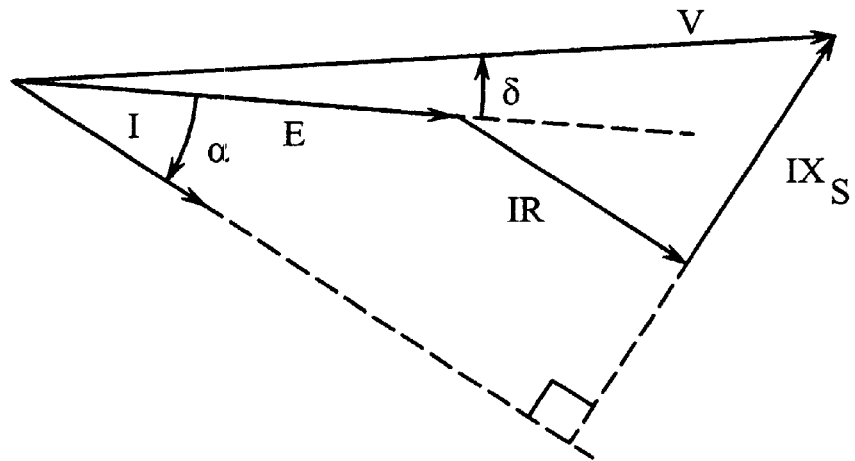
FIG. 2 is a phasor diagram of a permanent magnet motor under constant voltage excitation.

Referring now to FIGS. 1 and 2, a system for controlling torque is generally shown at 10. The system 10 controls torque of a sinusoidally excited permanent magnet motor 12. The system includes a rotor position encoder 14, a speed measuring circuit 16, a controller 18, an inverter 20 and a power source 22.

Unlike the prior art, the torque of the motor 12 is controlled without the use of current sensors. By eliminating the current sensors, the low frequency torque ripple is reduced so that the output torque is smoother. Instead of controlling the torque producing current, the controller 18 determines a voltage required for producing a desired torque based on motor equations, described below. This voltage mode control method is based on machine operation phasor diagram as shown in FIG. 2. Under steady state operating condition, the voltage phasor $\vec{V}$, back-emf phasor $\vec{E}$ and current phasor $\vec{I}$ of a sinusoidally excited PM motor are governed by:

$$\vec{V} = \vec{E} + \vec{I}R + j\vec{I}X_s \qquad (1)$$

where R is the winding resistance, $X_s$ is the phase reactance which is equal to the product of motor inductance $L_s$ and the excitation frequency ω(rad./sec.). Here, it is assumed that the angle between back-emf phasor $\vec{E}$ and current phasor $\vec{I}$ is α and the angle between the voltage phasor $\vec{V}$ and the back-emf phasor $\vec{E}$ is δ.

Neglecting motor iron losses, friction and windage losses, the output power of the PM motor is equal to $$P = 3IE \cos \alpha \qquad (2)$$

and the output torque is $$T = P/\omega_m \qquad (3)$$

where $\omega_m = \omega/$(no. of pole pairs). Based on the phasor diagram, it can be derived that $$V \cos \delta = E + IR \cos \alpha + IX_s \sin \alpha \qquad (4)$$

$$V \sin \delta = -IR \sin \alpha + IX_s \cos \alpha \qquad (5)$$

Solving equations 4 and 5 yields $$\cos \alpha = \frac{(V\cos\delta - E)R + X_s V \sin\delta}{I(R^2 + X_s^2)} \qquad (6)$$

By substituting equation 6 into equation 2, it is obtained that $$P = 3E \frac{(V\cos\delta - E)R + X_s V \sin\delta}{R^2 + X_s^2} \qquad (7)$$

From equation 7 and equation 3, the motor torque can be expressed as $$T = 3K_e \frac{(V\cos\delta - K_e\omega_m)R + X_s V \sin\delta}{R^2 + X_s^2} \qquad (8)$$

where $K_e = E/\omega_m$ is the EMF constant. It can be seen from equation 8 that the motor torque is dependent on the motor input voltage V, the motor parameters and operating speed. Hence, given the motor parameters and speed, by controlling the voltage magnitude V and its phase angle δ relative to back-emf E, it is possible to control the motor torque to a desired value. Equation 8 forms the basis of the control method. The voltage required for any given torque command $T_{cmd}$ can be calculated by substituting $T_{cmd}$ into equation 8 and solving for V:

$$V = \frac{1}{R\cos\delta + X_s \sin\delta}\left(\frac{R^2 + X_s^2}{3K_e}T_{cmd} + ER\right) \qquad (9)$$

$$= \frac{1}{R\cos\delta + (\omega L_s)\sin\delta}\left(\frac{R^2 + (\omega L_s)^2}{3K_e}T_{cmd} + K_e\omega_m R\right)$$

Equation 9 (FIG. 1) shows that, for a fixed angle δ (e.g., δ at a line 36 from a lookup table 38) between the back-emf and the terminal voltage, to maintain a torque equal to the commanded torque with varying speed, the amplitude of motor input voltage must change. Thus, information of motor parameters, rotor speed, and position angle is required, but no current feedback is needed for the controller to develop a signal to produce a desired motor torque.

In the voltage mode control, the angle δ has to be chosen properly. By referring to FIG. 2, it can be seen that the phase angle α between the current and the back-emf depends on the angle δ. By choosing proper phase angles α, the motor armature current can induce a magnetic flux component opposed to the magnet field. Therefore, the choice of δ can cause the voltage control to mimic in performance the equivalent current control with field weakening.

Figure 3:
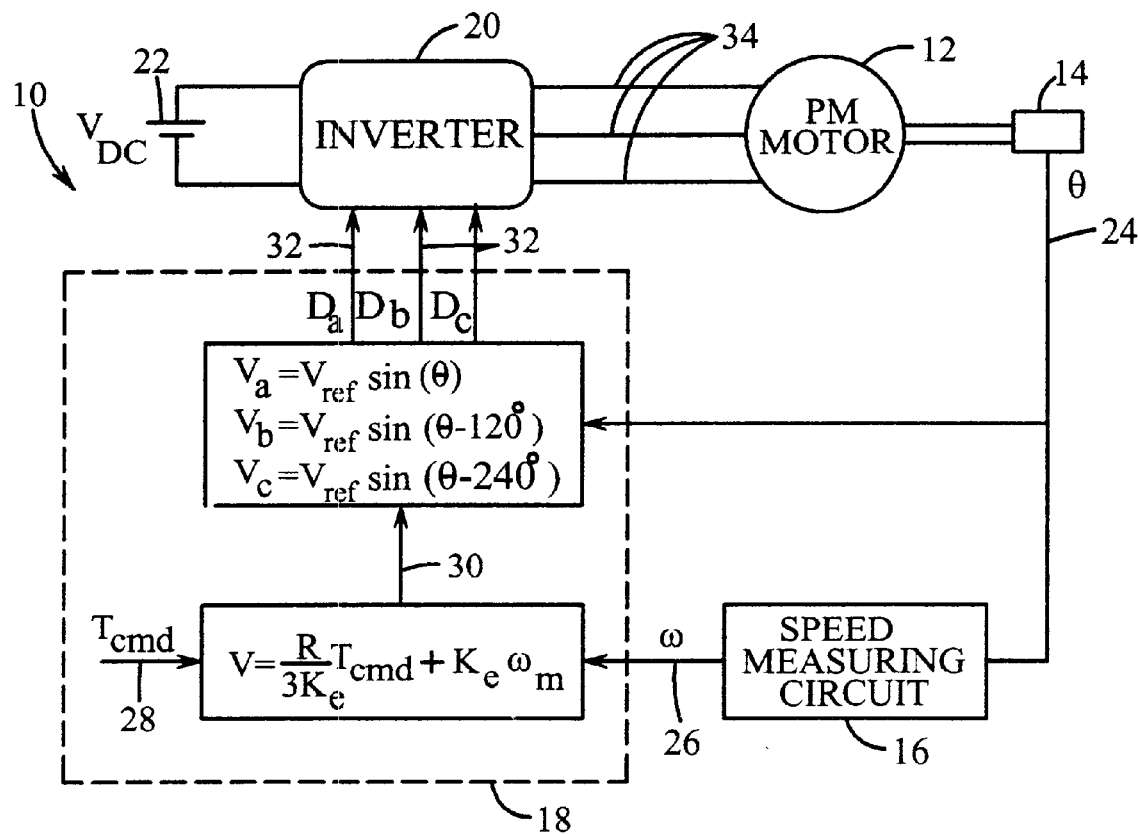
FIG. 3 is a block diagram of a system for controlling the torque of a sinusoidally excited permanent magnet motor according to another embodiment.

Referring to FIG. 3, in a preferred embodiment the voltage mode control method is implemented for a permanent magnet (synchronous) motor with slotless windings having a sinusoidal air gap flux distribution. This type of motor has a large effective air gap and thus, armature currents produce a flux that is negligible compared to the permanent magnet field. As a result, saturation or demagnetization of the permanent field is unlikely to occur in normal operation and a fixed value of δ can be used. Thus, for slotless winding machines, the voltage mode control is particularly suitable. For this exemplary motor, the motor parameters are listed below:

| | |
|---|---|
| Motor Type | PM, Sinusoidal, three-phase |
| Pole Number | $N_p = 4$ |
| Input Voltage | $V_{dc} = 12$ V |
| Effective Phase Resistance | R = 55 mΩ |
| Inductance | $L_s = 38.5$ μH |
| Maximum No Load Speed | 2800 RPM |
| Maximum Reactance | 22.5 mΩ |
| EMF Constant | $K_e = 0.023$ V/(rad/s) |
| Encoder Resolution | 2.5 degree (electrical) |

Based on these motor parameters, the winding reactance of the motor at the maximum speed is relatively small in comparison with its effective winding resistance. This means that, for any given voltage, the angle δ between the voltage and back-emf phasors is very small and so is the angle α between V and E and the current. Therefore, a suitable choice of the angle δ between V and E is a constant zero. Based on this condition, the control equation can be reduced to $$V = \left(\frac{R^2 + (\omega_e L_s)^2}{3K_e R}\right)T_{cmd} + K_e\omega_m$$

For a hardware implementation, further simplification is preferred. Since the motor reactance is much smaller than the resistance, the initial implementation can ignore the inductance term in equation 10. Therefore, the following simplified control equation may be implemented by the controller 18:

$$V = \frac{R}{3K_e}T_{cmd} + K_e\omega_m \tag{11}$$

The power inverter 20 is coupled between power source 22 and the controller 18 to supply the phase voltages across the motor windings. The inverter is controlled by space vector pulse width modulated signals generated by the controller 18. Taking the gain of the inverter into account using a space vector pulse width modulation scheme, the normalized voltage amplitude is given by: $V_{ref}=V/(V_{dc}/\sqrt{6})$. By substituting $V_{ref}$ for V in equation 11, the following simplified control equation is preferably implemented by the controller 18 (FIG. 3):

$$V_{ref}=K_1 T_{cmd}+K_2\omega_m \tag{12}$$

where $K_1=(\sqrt{6}R)/(3K_e V_{dc})$ and $K_2=(\sqrt{6}K_e)/V_{dc}$. The maximum and minimum values of $V_{ref}$ are clamped to +1 and −1. Thus, for a given PM motor and fixed battery voltage, $K_1$ and $K_2$ are constant and can be stored in the controller memory allowing the control equation to be implemented without using current sensors.

For the controller 18 to develop the correct voltage needed to produce the desired torque, the position and speed of the rotor are needed. A rotor position encoder 14 is connected to the motor 12 to detect the angular position of the rotor. The encoder 14 may sense the rotary position based on optical detection or magnetic field variations, such being known. The encoder 14 outputs a position signal θ at a line 24 indicating the angular position of the rotor.

From the position signal θ, the speed measuring circuit 16 determines the speed of the rotor and outputs a speed signal ω at a line 26. The speed measuring circuit 16 may include a counter that counts the position signal pulses for a predetermined duration. The count value is proportional to the speed of the motor. For example, if a counter counts the position signal pulses in time intervals of 5 ms and the encoder has a resolution of 2.5 degrees, then the speed measurement will have a resolution of about 41.7 rpm. The speed signal can also be obtained by any other method, such as the derivative of the position signal from the equation $\omega_m=\Delta\theta_m/\Delta t$ where $\Delta t$ is the sampling time and $\Delta\theta_m$ is the change in position during the sampling interval.

The position and speed signals θ, ω, and a torque command signal $T_{cmd}$ at a line 28 are applied to the controller 18. The torque command signal $T_{cmd}$ is indicative of the desired motor torque. The controller 18 determines a voltage amplitude at a line 30 required to develop the desired torque by using the position, speed and torque command signals θ, ω, $T_{cmd}$ and other fixed motor parameter values in the control equation. For a three-phase motor, three sinusoidal reference signals that are synchronized with the motor back-emf are required to generate the required motor input voltages. The controller transforms the voltage amplitude signal into three-phase by determining phase voltage command signals $V_a$, $V_b$, and $V_c$ from the voltage amplitude signal and the position signal θ according to the following equations:

$$V_a=V_{vef}\sin(\theta) \tag{13}$$

$$V_b=V_{vef}\sin(\theta-120°) \tag{14}$$

$$V_c=V_{vef}\sin(\theta-240°) \tag{15}$$

Motor voltage command signals 32 of the controller 18 are applied to power inverter 20 which is coupled with power source 22 to apply phase voltages at lines 34 to the stator windings of the motor 12 in response to motor voltage command signals at lines 32. But in order to generate phase voltages with an average sinusoidal shape, switching devices (not shown) of the inverter 20 must be turned on and off for specific durations at specific rotor angular positions. Control of the inverter 20 can be implemented according to any appropriate pulse width modulation (PWM) scheme. However, since space vector modulation (SVM) has the advantages of higher output voltage, low harmonic distortion, low switching power losses and easy microprocessor implementation, SVM-based control is preferred. The duty cycle of each phase voltage command signal is given by:

$$D_a=0.5(1+sV_a) \tag{16}$$

$$D_b=0.5(1+sV_b) \tag{17}$$

$$D_c=0.5(1+sV_c) \tag{18}$$

and the space vector voltages $sV_a$, $SV_b$, $sV_c$ are obtained from the following logic equations:

IF $$((V_b\geq V_a)\&(V_a\geq V_c)) \text{ or } ((V_c\geq V_a)\&(V_a\geq V_b))$$

THEN $$sV_a=\sqrt{3}\,V_a$$

$$sV_b=(1/\sqrt{3})(V_b-V_b)$$

$$sV_c=-sV_b \tag{19}$$

IF $$((V_a\geq V_b)\&(V_b\geq V_c)) \text{ or } ((V_c\geq V_b)\&(V_b\geq V_a))$$

THEN $$sV_a=(1/\sqrt{3})(V_a-V_c)$$

$$sV_b=\sqrt{3}\,V_b$$

$$sV_c=-sV_b \tag{20}$$

IF $$((V_a\geq V_c)\&(V_c\geq V_b)) \text{ or } ((V_b\geq V_c)\&(V_c\geq V_a))$$

THEN $$sV_a=(1/\sqrt{3})(V_a-V_b)$$

$$sV_b=-sV_a$$

$$sV_c=\sqrt{3}\,V_c \tag{21}$$

This modulation scheme provides a rms fundamental line to line voltage of 0.7071 $V_{dc}$, which is 15.5% higher than that of a simple sine modulation scheme.

Figure 4:
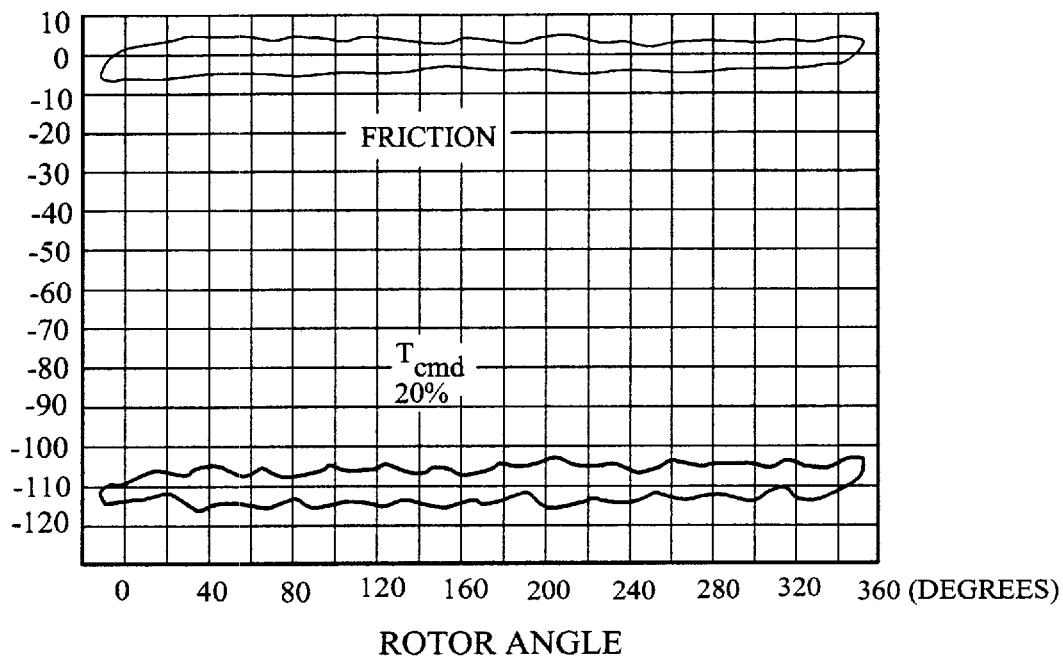
FIG. 4 is a graph of torque vs. rotor angle for a motor controlled by a voltage mode control method at 20% torque command.
Figure 5:
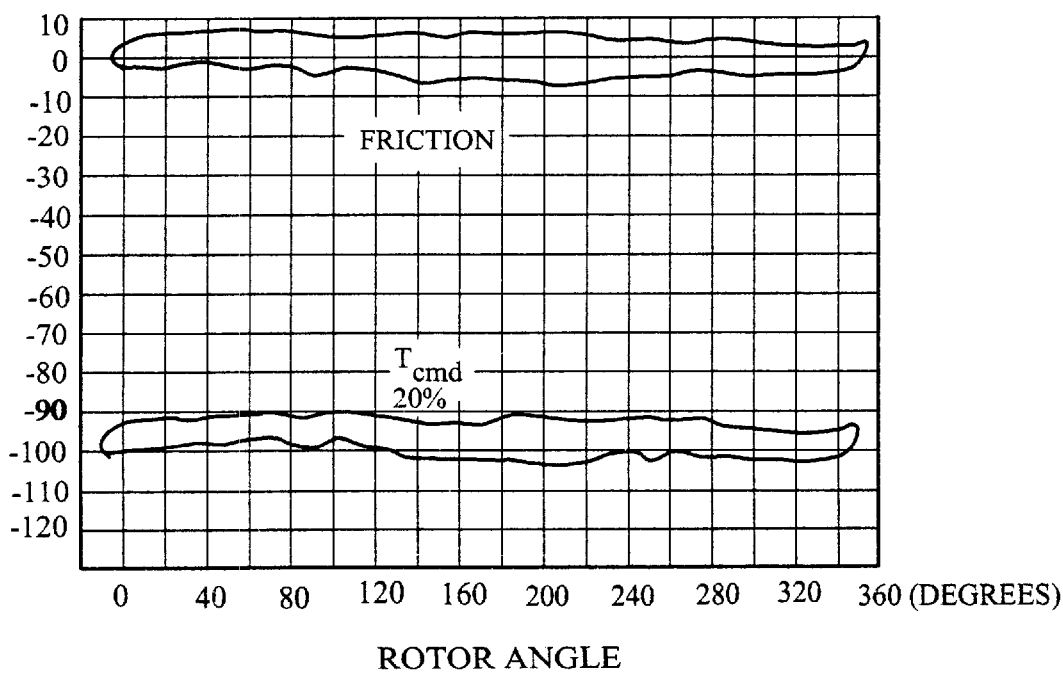
FIG. 5 is a graph of torque vs. rotor angle for a motor controlled by a current mode control method at 20% torque command.

By using this voltage mode control method, the low frequency torque ripple is reduced. FIG. 4 shows the results of a test performed to measure the torque ripple performance of the voltage control method of the invention. The test was performed on a rotor of a PM motor that was locked and the rotor angle varied slowly. Thus, the test can be considered to be conducted at zero speed. FIG. 4 shows that there is still some torque ripple in the voltage mode. But the characteristic of torque ripple is different from that of the current mode that is shown in FIG. 5. Unlike the current mode, the frequency of the torque ripple is at the motor commutation frequency which is six times the fundamental frequency. Also, there are no fundamental or 2nd harmonic components as seen in FIG. 5. The fact that the torque ripple frequency is six times higher than the current mode allows the voltage mode control method to provide a smoother torque as the higher frequency component is easily filtered out by the system inertia.

The voltage mode control method is not expected to provide the same precise torque control as the current mode. This is because the voltage mode control is a feed-forward control, instead of a closed-loop regulation, and changes in the motor parameters can directly influence the output level. Therefore, it should be applied to only those applications where precise torque level control is not critical.

One such application is in an electrical power steering system. The motor is coupled directly into the steering column to provide assisted steering torque. The desired torque has only to provide the "right feel." Also, since the voltage mode control reduces the low frequency torque ripple felt at the steering wheel, a very smooth steering feel is achieved.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of controlling a sinusoidally excited permanent magnet motor having known motor parameters, comprising:

generating a motor angular position signal indicative of an angular position of the motor;

generating a motor speed signal indicative of a speed of the motor;

determining, in response to the known motor parameters, the motor angular position signal, the motor speed signal, a torque command signal, and amplitudes for input motor phase voltages, the torque command signal being indicative of a desired torque on the motor; and applying the input motor phase voltages at the amplitudes determined to the motor, wherein the desired torque on the motor is produced.

2. An apparatus for controlling a sinusoidally excited permanent magnet motor having known motor parameters, comprising:

a position encoder associated with the motor for sensing an angular position of the motor and providing a motor angular position signal indicative thereof;

a speed measurement circuit associated with the position encoder for measuring a speed of the motor and providing a motor speed signal indicative thereof;

a controller in communication with the position encoder for receiving the motor angular position signal and in communication with the speed measurement circuit for receiving the motor speed signal, the controller providing, in response to the known motor parameters, the motor angular position signal, the motor speed signal, and a torque command signal, voltage command signals, the torque command signal being indicative of a desired torque on the motor; and an inverter in communication with the controller for receiving the voltage command signals and in communication with a power source, the inverter applying, in response to the voltage command signals, input motor phase voltages to the motor, wherein the desired torque on the motor is produced.

3. An apparatus for controlling a sinusoidally excited permanent magnet motor having known motor parameters, comprising:

a position encoder associated with the motor for sensing an angular position of the motor and providing a motor angular position signal indicative thereof;

a speed measurement circuit associated with the position encoder for measuring a speed of the motor and providing a motor speed signal indicative thereof;

a controller in communication with the position encoder for receiving the motor angular position signal and in communication with the speed measurement circuit for receiving the motor speed signal, the controller providing, in response to the known motor parameters, the motor angular position signal, the motor speed signal, and a torque command signal, voltage command signals, the torque command signal being indicative of a desired torque on the motor; and an inverter in communication with the controller for receiving the voltage command signals and in communication with a power source, the inverter applying, in response to the voltage command signals, input motor phase voltages to the motor, wherein the desired torque on the motor is produced; and wherein said controller does not employ current or voltage feedback.

4. A method of controlling a sinusoidally excited permanent magnet motor having known motor parameters, comprising:

generating a motor angular position signal indicative of an angular position of the motor;

generating a motor speed signal indicative of a speed of the motor;

determining, in response to the known motor parameters, the motor angular position signal, the motor speed signal, a torque command signal, and amplitudes for input motor phase voltages, the torque command signal being indicative of a desired torque on the motor;

applying the input motor phase voltages at the amplitudes determined to the motor, wherein the desired torque on the motor is produced; and wherein the determining the amplitudes for the input motor phase voltages comprises calculating the amplitudes according to a control equation comprising:

$$V = \frac{1}{R\cos\delta + (\omega L_s)\sin\delta}\left(\frac{R^2 + (\omega L_s)^2}{3K_e}T_{cmd} + K_e\omega_m R\right)$$

where
V=amplitude of the input voltage of the motor;
R=resistance of the motor windings;
$X_s$=reactance of motor phase winding;
$K_e = E/\omega_m$ which is EMF constant;
$\omega_m$=speed of the motor;
$T_{cmd}$=torque command signal; and
$\delta$=angle between EMF phasor $\vec{E}$ and voltage phasor $\vec{V}$.

5. A method of controlling a sinusoidally excited permanent magnet motor having known motor parameters, comprising:

generating a motor angular position signal indicative of an angular position of the motor;

generating a motor speed signal indicative of a speed of the motor;

determining, in response to the known motor parameters, the motor angular position signal, the motor speed signal, a torque command signal, and amplitudes for input motor phase voltages, the torque command signal being indicative of a desired torque on the motor;

applying the input motor phase voltages at the amplitudes determined to the motor, wherein the desired torque on the motor is produced; and wherein the determining the amplitudes for the input motor phase voltages comprises calculating the amplitudes according to a control equation comprising:

$$V_{ref} = K_1 T_{cmd} + K_2 \omega_m$$

where $V_{ref}$=normalized voltage for generating the pulse width modulation signals to control the inverter;

$$K_1 = \frac{\sqrt{6}\,R}{3K_e V_{dc}};$$

$T_{cmd}$=torque command signal;

$$K_2 = \frac{\sqrt{6}\,K_e}{V_{dc}};$$

$K_e = E/\omega_m$ which is EMF constant;
$R$=resistance of the motor windings;
$V_{dc}$=the DC supply voltage; and
$\omega_m$=speed of the motor.

6. A power steering assist system comprising:

a steering wheel and column;

an electric motor comprising a motor controller, said electric motor adapted to impart rotational force to said steering column;

a power steering controller adapted to control said electric motor in a manner effective in providing power steering assist to an operator of said steering wheel; and wherein said electric motor controller operates by a method comprising:

generating a motor angular position signal indicative of an angular position of the motor;

generating a motor speed signal indicative of a speed of the motor;

determining, in response to the known motor parameters, the motor angular position signal, the motor speed signal, a torque command signal, and amplitudes for input motor phase voltages, the torque command signal being indicative of a desired torque on the motor;

applying the input motor phase voltages at the amplitudes determined to the motor, wherein the desired torque on the motor is produced; and wherein said determining does not employ current or voltage feedback.

7. An apparatus for controlling a sinusoidally excited permanent magnet motor having known motor parameters, comprising:

a position encoder associated with the motor for sensing an angular position of the motor and providing a motor angular position signal indicative thereof;

a speed measurement circuit associated with the position encoder for measuring a speed of the motor and providing a motor speed signal indicative thereof;

a controller in communication with the position encoder for receiving the motor angular position signal and in communication with the speed measurement circuit for receiving the motor speed signal, the controller providing, in response to the known motor parameters, the motor angular position signal, the motor speed signal, and a torque command signal, voltage command signals, the torque command signal being indicative of a desired torque on the motor; and an inverter in communication with the controller for receiving the voltage command signals and in communication with a power source, the inverter applying, in response to the voltage command signals, input motor phase voltages to the motor, wherein the desired torque on the motor is produced; and wherein the controller calculates the amplitudes according to a control equation comprising:

$$V = \frac{1}{R\cos\delta + (\omega L_s)\sin\delta} \left( \frac{R^2 + (\omega L_s)^2}{3K_e} T_{cmd} + K_e \omega_m R \right)$$

where

V=amplitude of the input voltage of the motor;
R=resistance of the motor windings;
$X_s$=reactance of motor phase winding;
$K_e = E/\omega_m$ which is EMF constant;
$\omega_m$=speed of the motor;
$T_{cmd}$=torque command signal; and
$\delta$=angle between EMF phasor $\vec{E}$ and voltage phasor $\vec{V}$.

8. An apparatus for controlling a sinusoidally excited permanent magnet motor having known motor parameters, comprising:

a position encoder associated with the motor for sensing an angular position of the motor and providing a motor angular position signal indicative thereof;

a speed measurement circuit associated with the position encoder for measuring a speed of the motor and providing a motor speed signal indicative thereof;

a controller in communication with the position encoder for receiving the motor angular position signal and in communication with the speed measurement circuit for receiving the motor speed signal, the controller providing, in response to the known motor parameters, the motor angular position signal, the motor speed signal, and a torque command signal, voltage command signals, the torque command signal being indicative of a desired torque on the motor; and an inverter in communication with the controller for receiving the voltage command signals and in communication with a power source, the inverter applying, in response to the voltage command signals, input motor phase voltages to the motor, wherein the desired torque on the motor is produced; and wherein the controller calculates the amplitudes according to a control equation comprising:

$$V_{ref} = K_1 T_{cmd} + K_2 \omega_m$$

where $V_{ref}$=normalized voltage for generating the pulse width modulation signals to control the inverter;

$$K_1 = \frac{\sqrt{6}\,R}{3K_e V_{dc}};$$

$T_{cmd}$=torque command signal;

$$K_2 = \frac{\sqrt{6}\,K_e}{V_{dc}};$$

$K_e$=E/$\omega_m$ which is EMF constant;
R=resistance of the motor windings;
$V_{dc}$=the DC supply voltage; and
$\omega_m$=speed of the motor.

9. A power steering assist apparatus comprising:
a steering wheel and column;
an electric motor comprising a motor controller, said electric motor adapted to impart rotational force to said steering column;
a power steering controller adapted to control said electric motor in a manner effective in providing power steering assist to an operator of said steering wheel; and
wherein said motor controller further comprises:
  a position encoder associated with the motor for sensing an angular position of the motor and providing a motor angular position signal indicative thereof;
  a speed measurement circuit associated with the position encoder for measuring a speed of the motor and providing a motor speed signal indicative thereof;
  a controller in communication with the position encoder for receiving the motor angular position signal and in communication with the speed measurement circuit for receiving the motor speed signal, the controller providing, in response to the known motor parameters, the motor angular position signal, the motor speed signal, and a torque command signal, voltage command signals, the torque command signal being indicative of a desired torque on the motor and wherein said controller does not employ current or voltage feedback; and
  an inverter in communication with the controller for receiving the voltage command signals and in communication with a power source, the inverter applying, in response to the voltage command signals, input motor phase voltages to the motor, wherein the desired torque on the motor is produced.

10. A method for reducing torque ripple in a sinusoidally excited permanent magnet motor, comprising:
  generating a motor angular position signal indicative of an angular position of the motor;
  generating a motor speed signal indicative of a speed of the motor;
  determining, in response to the known motor parameters, the motor angular position signal, the motor speed signal, and a torque command signal, amplitudes for input motor phase voltages, the torque command signal being indicative of a desired torque on the motor;
  applying the input motor phase voltages at the amplitudes determined to the motor, wherein the desired torque on the motor is produced; and
  wherein said determining does not employ current or voltage feedback.

11. An apparatus for reducing torque ripple in a sinusoidally excited permanent magnet motor having known motor parameters, comprising:
  a position encoder associated with the motor for sensing an angular position of the motor and providing a motor angular position signal indicative thereof;
  a speed measurement circuit associated with the position encoder for measuring a speed of the motor and providing a motor speed signal indicative thereof;
  a controller in communication with the position encoder for receiving the motor angular position signal and in communication with the speed measurement circuit for receiving the motor speed signal, the controller providing, in response to the known motor parameters, the motor angular position signal, the motor speed signal, and a torque command signal, voltage command signals, the torque command signal being indicative of a desired torque on the motor, and wherein said controller does not employ current or voltage feedback; and
  an inverter in communication with the controller for receiving the voltage command signals and in communication with a power source, the inverter applying, in response to the voltage command signals, input motor phase voltages to the motor, wherein the desired torque on the motor is produced.

12. A method of controlling a sinusoidally excited permanent magnet motor having known motor parameters, comprising:
  generating a motor angular position signal indicative of an angular position of the motor;
  generating a motor speed signal indicative of a speed of the motor;
  determining, in response to the known motor parameters, the motor angular position signal, the motor speed signal, a torque command signal, and amplitudes for input motor phase voltages, the torque command signal being indicative of a desired torque on the motor;
  applying the input motor phase voltages at the amplitudes determined to the motor, wherein the desired torque on the motor is produced; and
  wherein said determining does not employ current or voltage feedback.

13. The method of claim 2 wherein the determining further comprises determining phases of the input motor phase voltages so that the phases of the input motor phase voltages are in phase with respective back-emfs of the motor.

14. The method of claim 13 wherein the determining phases of the input motor phase voltages utilizes pulse width modulation.

15. The apparatus of claim 3 wherein the voltage command signals control amplitudes of the input motor phase voltages.

16. The apparatus of claim 3 wherein the voltage command signals control phases of the input motor phase voltages so that the phases of the input motor phase voltages are in phase with respective back-emfs of the motor.

17. The apparatus of claim 3 wherein the controller further includes a pulse width modulation circuit for controlling the phases of the input motor phase voltages so that the phases of the input motor phase voltages are in phase with respective back-emfs of the motor.

18. The apparatus of claim 3 wherein the controller comprises a microprocessor.

* * * * *